US009269384B1

(12) United States Patent
Buch (10) Patent No.: US 9,269,384 B1
(45) Date of Patent: Feb. 23, 2016

(54) TEMPLATE MISALIGNMENT AND ECCENTRICITY ERROR COMPENSATION FOR A PATTERNED MEDIUM (71) Applicant: Seagate Technology LLC, Cupertino, CA (US)

(72) Inventor: Bruce Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/725,858

(22) Filed: May 29, 2015

(51) Int. Cl.
*G11B 5/09* (2006.01)
*G11B 5/596* (2006.01)

(52) U.S. Cl.
CPC ........ *G11B 5/59616* (2013.01); *G11B 5/59627* (2013.01)

(58) Field of Classification Search
None
See application file for complete search history.

(56) References Cited

U.S. PATENT DOCUMENTS

| | | | |
|---|---|---|---|
| 4,494,156 A * | 1/1985 | Kadison | G06F 3/0601 360/15 |
| 6,275,458 B1 * | 8/2001 | Wong | G11B 7/0045 369/124.12 |
| 6,746,825 B2 | 6/2004 | Nealey et al. | |
| 6,822,833 B2 | 11/2004 | Yang et al. | |
| 6,893,705 B2 | 5/2005 | Thomas et al. | |
| 7,029,773 B2 | 4/2006 | van de Veerdonk et al. | |
| 7,041,394 B2 | 5/2006 | Weller et al. | |
| 7,344,773 B2 | 3/2008 | Subramanya et al. | |
| 7,351,445 B2 | 4/2008 | Haginoya et al. | |
| 7,416,991 B2 | 8/2008 | Bandic et al. | |
| 7,675,703 B2 | 3/2010 | Albrecht et al. | |
| 7,729,074 B2 | 6/2010 | Venkataramani et al. | |
| 7,848,048 B1 | 12/2010 | Albrecht et al. | |
| 7,959,975 B2 | 6/2011 | Millward | |
| 8,051,304 B2 | 11/2011 | Takiguchi et al. | |
| 8,133,341 B2 | 3/2012 | Nealey et al. | |
| 8,133,534 B2 | 3/2012 | Stoykovich et al. | |
| 8,158,284 B2 | 4/2012 | Kimura | |
| 8,213,103 B2 | 7/2012 | Grobis et al. | |
| 8,304,493 B2 | 11/2012 | Millward et al. | |
| 8,355,300 B2 | 1/2013 | Grobis et al. | |
| 8,582,226 B2 | 11/2013 | Tetzlaff et al. | |
| 8,625,222 B2 | 1/2014 | Grundvig | |
| 8,730,605 B1 * | 5/2014 | Madden | G11B 5/59616 360/51 |
| 2002/0132083 A1 | 9/2002 | Weller et al. | |
| 2003/0091865 A1 | 5/2003 | Chen et al. | |
| 2003/0147166 A1 * | 8/2003 | Hetzler | G11B 5/09 360/51 |
| 2003/0194582 A1 | 10/2003 | Ishikawa et al. | |

(Continued)

FOREIGN PATENT DOCUMENTS

JP 2007-313568 A 12/2007
JP 2008-090956 A 4/2008

(Continued)

*Primary Examiner* — Peter Vincent Agustin
(74) *Attorney, Agent, or Firm* — Hall Estill Attorneys at Law (57) ABSTRACT

Compensation for template misalignment and offset induced eccentricity errors for a multi-template patterned medium, such as a bit patterned medium (BPM) used to record data in a data storage device. In some embodiments, a rotatable patterned data recording medium has a plurality of concentric tracks, each track having data fields interspersed with servo fields and timing fields. A data transducer senses the respective data, servo and timing fields on a target track. A disc-locked clock (DLC) circuit generates separate servo clock and data clock signals that are frequency modulated responsive to variations in locations of the timing fields.

20 Claims, 7 Drawing Sheets

(56) References Cited

U.S. PATENT DOCUMENTS

| | | |
|---|---|---|
| 2004/0071924 A1 | 4/2004 | Yang et al. |
| 2006/0023602 A1 * | 2/2006 | Rauschmayers ... G11B 20/1403 369/59.19 |
| 2006/0092541 A1 | 5/2006 | Moser |
| 2006/0222898 A1 | 10/2006 | Ichihara |
| 2008/0176749 A1 | 7/2008 | Goyal |
| 2008/0304173 A1 | 12/2008 | Albrecht et al. |
| 2009/0087664 A1 | 4/2009 | Nealey et al. |
| 2009/0196488 A1 | 8/2009 | Nealey et al. |
| 2009/0308837 A1 | 12/2009 | Albrecht et al. |
| 2010/0118427 A1 | 5/2010 | Buch et al. |
| 2010/0124638 A1 | 5/2010 | Xiao et al. |
| 2010/0183957 A1 | 7/2010 | Wang et al. |
| 2012/0107583 A1 | 5/2012 | Xiao et al. |
| 2013/0003214 A1 * | 1/2013 | Grundvig ........... G11B 5/59616 360/51 |

FOREIGN PATENT DOCUMENTS

| | | |
|---|---|---|
| JP | 2010-056257 A | 3/2010 |
| WO | 2004001756 A1 | 12/2003 |
| WO | 2006118677 A2 | 11/2006 |

* cited by examiner

TEMPLATE MISALIGNMENT AND ECCENTRICITY ERROR COMPENSATION FOR A PATTERNED MEDIUM

SUMMARY

Various embodiments of the present invention are generally directed to compensating for template misalignment and offset induced eccentricity errors associated with a multi-template patterned medium, such as a bit patterned medium (BPM) used to record data in a data storage device.

In some embodiments, an apparatus includes a rotatable patterned data recording medium having a plurality of concentric tracks, each track having data fields interspersed with servo fields and timing fields. A data transducer is configured to sense the respective data, servo and timing fields on a target track. A disc-locked clock (DLC) circuit generates separate servo clock and data clock signals that are frequency modulated responsive to variations in locations of the timing fields.

In other embodiments, a data storage device has a rotatable patterned data recording medium with a plurality of concentric tracks, each track having a plurality of data fields interspersed with a plurality of servo fields and a plurality of timing fields. An actuator assembly supports a data transducer configured to sense the respective data, servo and timing fields on a target track. A disc-locked clock (DLC) circuit generates separate servo clock and data clock signals that are frequency modulated responsive to variations in locations of the plurality of timing fields using a tone generator which generates a feedforward correction value to compensate for eccentricity error associated with locations of the timing fields. A data read/write channel passes write currents to the transducer to write data to the data fields and applies signal processing to readback signals from the transducer to read data from the data fields. The channel has a servo counter which uses the data clock to count from a baseline value to a maximum value over each interval between successively received servo fields and a data counter which uses the data clock to count from a baseline value to a maximum value over each interval between successively received timing fields.

In other embodiments, a method includes rotating a patterned data recording medium at a selected rotational velocity about a central axis, the medium having a plurality of concentric tracks, each track having a plurality of data fields interspersed with a plurality of servo fields and a plurality of timing fields; using a data transducer to sense the respective data, servo and timing fields on a target track on the medium; and generating separate servo clock and data clock signals that are frequency modulated responsive to variations in locations of the plurality of timing fields as sensed by the transducer from the target track.

These and other features and advantages which characterize the various embodiments of the present disclosure can be understood in view of the following detailed discussion and the accompanying drawings.

DETAILED DESCRIPTION

The present disclosure generally relates to patterned media, and more particular to compensation strategies to address pattern misalignment and offset eccentricity errors associated with a patterned medium, such as but not limited to a bit patterned medium (BPM) used in a magnetic recording system.

Bit patterned media (BPM) are a form of media used in certain types of data storage devices, such as hard disc drives (HDDs). BPM use discrete magnetic regions ("bits," "bit islands," "data recording dots," etc.) surrounded by non-magnetic material to store data in the form of recorded magnetic domains. The dots are arranged into concentric tracks. The tracks may use a single row of dots, or multiple adjacent rows of dots (hypertracks).

Each track includes data fields interspersed with servo fields and timing (interspersed phase lock loop, or iPPL) fields. The servo fields provide servo control information for a servo circuit to controllably position a data transducer adjacent the tracks. The timing fields provide channel clock timing information to a data read/write channel to write data to or read data from the tracks.

In a commonly employed configuration, the storage device performs a servo qualification operation to ensure the transducer is in a stable relation over each target track to which the transducer is moved. The servo qualification operation relies upon the decoding of a succession of servo fields from the target track. The storage device then switches over to a BPM mode (track following mode) to read and write data to the data fields once servo qualification is completed. BPM mode involves timing control based on the timing fields, so that angular positional control (down track) is provided by the timing fields and radial positional control (cross track) is provided by the servo fields.

BPM media can be formed in a number of ways. One approach is a so-called cross-printing process where pre-printed templates are used to transfer patterns to a substrate. Cross-printing processes use multiple templates having different features. In a typical cross-printing process, servo and cross-track features may be provided on a first template, and timing and down-track features may be provided on a second template. The use of multiple templates during the printing process can result in misalignments of the various features along each track, which are exhibited as precession errors and eccentricity errors.

Precession errors generally arise due to inter-template misalignment so that one template is linearly and/or rotatably offset with respect to another template. Eccentricity errors arise once the finished medium is mounted to a spindle motor having a center of rotation that is offset from the center of the printed patterns. Because of precession offsets, the once-per-rev repeated runout (RRO) errors of the eccentricity may be different for the servo patterns relative to the timing patterns. Moreover, because of the precession offsets, the actual timing between individual timing fields and servo fields can vary over each rotation. This can adversely affect the ability of the device to reliably position the transducer and read/write data during BPM mode.

Accordingly, various embodiments of the present disclosure are directed to an apparatus and method for compensating for these and other types of errors in a bit patterned medium (BPM). As explained below, separate compensation is provided for the respective servo fields and timing fields. Because these fields are separately compensated, tracking counters used to track the respective servo fields and timing fields can be independently initiated, which reduces the effects of actual precession errors between the servo field and the timing field counts.

Eccentricity correction is provided through the use of a modified disc-locked-clock (DLC) correction system that uses separate tone generators to provide different eccentricity correction input signals, one for the servo channel and one for the data channel. Alternatively, the modified DLC correction system can use a single tone generator, but implement firmware-generated DLC correction values so that different compensations are supplied for the servo channel and the data channel.

With regard to precession errors, the disclosed embodiments generally operate to initiate a respective servo (SAM-to-SAM) counter and a timing (P-to-P) counter at non-zero initialization values upon switching to a BPM mode of operation. This allows the SAM-to-SAM and P-to-P counters to run free after being "jump started" from a servo synchronization mode. In this way, the precession of the timing fields relative to the servo fields becomes irrelevant after the data clocks and counters get locked to the iPPL timing fields, and thus the channel only needs this initial count to execute a transition from servo qualification mode (servo sync) to BPM mode (timing field sync). In some cases, an additional data block (PS-to-PS) counter can be utilized as well. The PS-to-PS counter is synchronized to the P-to-P counter and counts data block intervals between successive servo fields.

In some embodiments, specially configured calibration tracks are disposed at selected locations on the medium, such as near the innermost diameter (ID) and outermost diameter (OD) of the medium. These calibration tracks can have unique ID fields adjacent the various respective servo and timing fields. A calibration routine can be separately carried out so that the system can determine which servo field has been encountered when BPM mode is declared, and from that determine appropriate initial values to start the respective servo and timing counters.

Figure 1A:
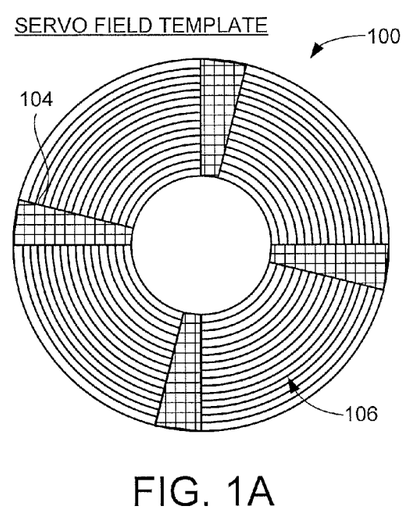
FIGS. 1A and 1B represent respective servo field and timing field templates for a multi-template patterned medium in accordance with some embodiments.
Figure 1B:
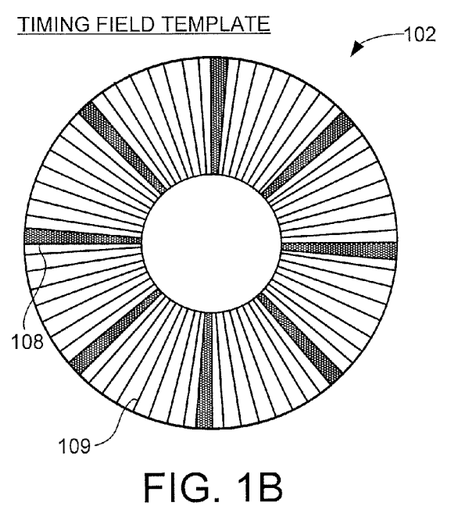

These and other features and aspects of various embodiments can be understood beginning with a review of FIGS. 1A and 1B, which respectively represent pattern templates 100, 102 for a bit patterned medium (BPM). The template 100 in FIG. 1A provides servo fields and cross-track features, and the template 102 in FIG. 1B provides timing (iPPL) fields and down-track features.

The servo fields are denoted at 104 in FIG. 1A as radially extending servo wedges comprising immediately adjacent servo fields that extend from the ID to the OD of the template (and resulting medium). Only four (4) servo fields 104 are shown, and the radial width of each is greatly exaggerated; in practice many hundreds of spaced apart servo fields 104 will be provisioned on each track. Track features are generally represented at 106 and may correspond to arrays of dots (islands) to provide localized magnetic domains during recording. The servo and track features are defined by the same template in order to maintain the requisite registration of tracks and servo data used to position the head with respect to the tracks.

The timing (iPPL) fields are denoted at 108, 109 in FIG. 1B. As before, the size of the fields has been exaggerated and many more may be provisioned than shown for simplicity of illustration. The timing fields 108, 109 may all take the same format, or may take different formats. The "wider" timing fields 108 represent fields configured to immediately precede or follow the servo fields 104 whereas the "narrower" timing fields (or other down track features) 109 are intended to provide timing control in the area between adjacent pairs of the servo fields 104. It will be appreciated at this point that the respective templates 100, 102 are highly simplified and that many different formats and configurations can be used.

Figure 2A:
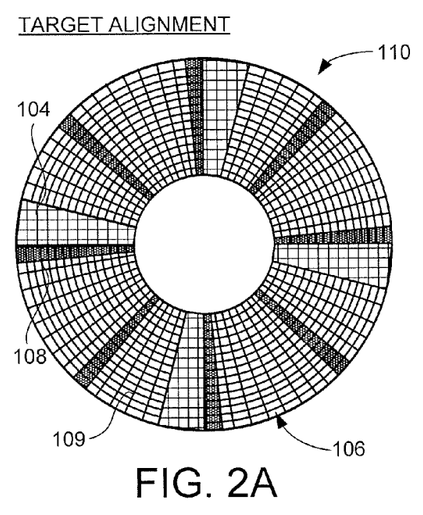
FIGS. 2A and 2B show a target alignment and a real world alignment of the templates of FIGS. 1A and 1B.

The templates 100, 102 are used in a photolithography or other transfer printing process to transfer the corresponding patterns onto a substrate (printed medium). FIG. 2A shows a first medium 110 to which both templates have been applied in such a way as to achieve a target, or ideal, alignment (within acceptable manufacturing tolerances). For simplicity of discussion, the various features (servo fields, timing fields, etc.) will be identified using the same numerical designations from FIGS. 1A and 1B. It can be seen from a review of FIG. 2A that each of the servo fields 104 are radially and angularly aligned with a corresponding one of the timing fields 108.

Figure 2B:
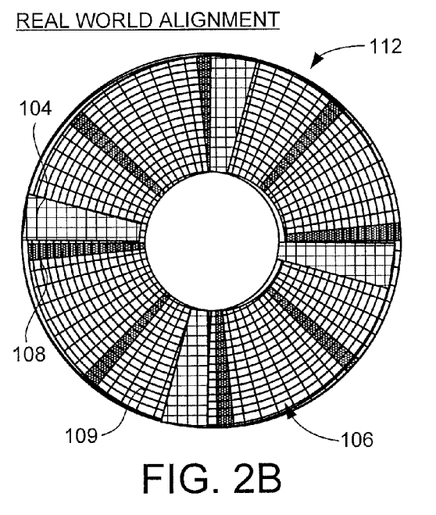

By contrast, FIG. 2B represents a second medium 112 having a more typical real world alignment of the respective templates. As can be seen, there are misalignments between the respective servo fields 104 and timing fields 108, including excessive gaps in some locations and overlaps in other locations. Moreover, a centering offset is depicted so that the respective features are not perfectly centered about a common central axis. Because of the nanoscale of these features, it is difficult using present technology to perform cross-printing without having such printing alignment errors. For example and not by way of limitation, current processes are limited to about 1 micron of linear offset and about 30 micro-radians of angular offset. As feature sizes continue to decrease and recording densities continue to increase, such offsets will tend to have greater amounts of influence on the operation of the medium.

Figure 3:
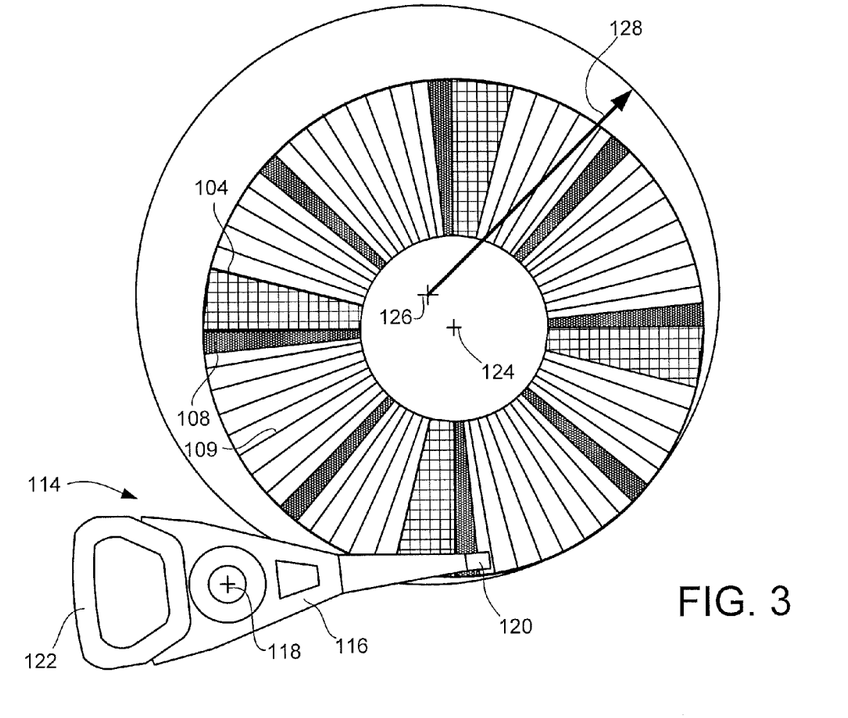
FIG. 3 represents an eccentric offset of a medium in an exemplary data storage device environment.

FIG. 3 illustrates another type of error that can arise using patterned media as in FIGS. 2A and 2B, namely, eccentricity error as a result of a misalignment of the medium when installed into a data storage device. The first medium 110 from FIG. 2A is shown in conjunction with an actuator assembly 114. The actuator assembly has a main body 116 that pivots about an actuator pivot axis 118. A data transducer 120 is supported at one end of the main body 116 and has read and write elements to read data from and write data to the medium 110. A voice coil 122 is supported at an opposing end of the main body and is immersed in a magnetic field of a voice coil motor (VCM, not shown). Controlled application of current to the VCM causes pivotal movement of the actuator assembly 114 and alignment of the transducer 120 with the various tracks defined on the medium 110.

The medium 110 has a central axis 124 about which the various features are nominally aligned. However, due to offset errors encountered during the mounting of the medium in the system (greatly exaggerated in FIG. 3), the actual rotational axis about which the medium rotates is at 126 with eccentricity radius 128.

It will be appreciated that the offset between axes 124, 126 is greatly exaggerated for illustration purposes. Nevertheless, it can be seen from FIG. 3 that, even if the printing process provides ideal alignment of the respective servo and timing features, eccentric rotation of the medium 110 will still cause repeated runout (RRO) errors that affect the respective timing and control during both servo qualification and BPM modes of operation. The additional timing errors resulting from real world template offset errors, as represented in FIG. 2B, only exasperate the control problem.

Accordingly, various embodiment of the present disclosure present a number of disc-locked clock (DLC) methodologies to compensate for these and potentially other types of eccentricities by generating a timing domain that largely cancels the impact of mechanical eccentricity, and to generate a stable servo timing anchor to facilitate stable data timing.

Figure 4A:
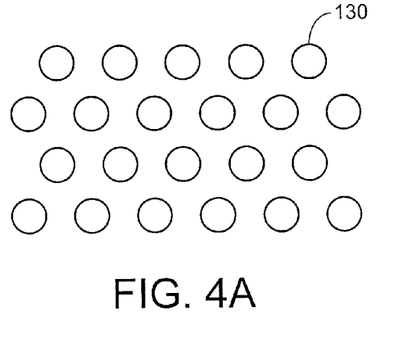
FIGS. 4A and 4B represent different types of recording bits (islands) of the medium of FIG. 3.
Figure 4B:
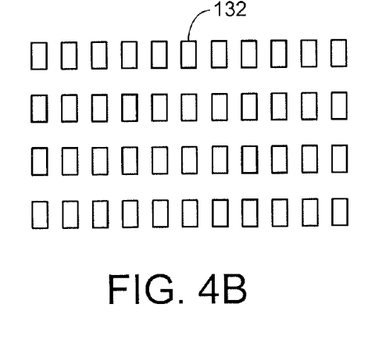

FIGS. 4A and 4B show different formats for the data fields used to store user data. Circular bit islands (recording dots) 130 or rectangular bit islands 132 can be used as desired to define the user data recording portions of the medium. Tracks can be defined as a single row or multiple rows of the respective bit islands 130, 132.

Figure 5:
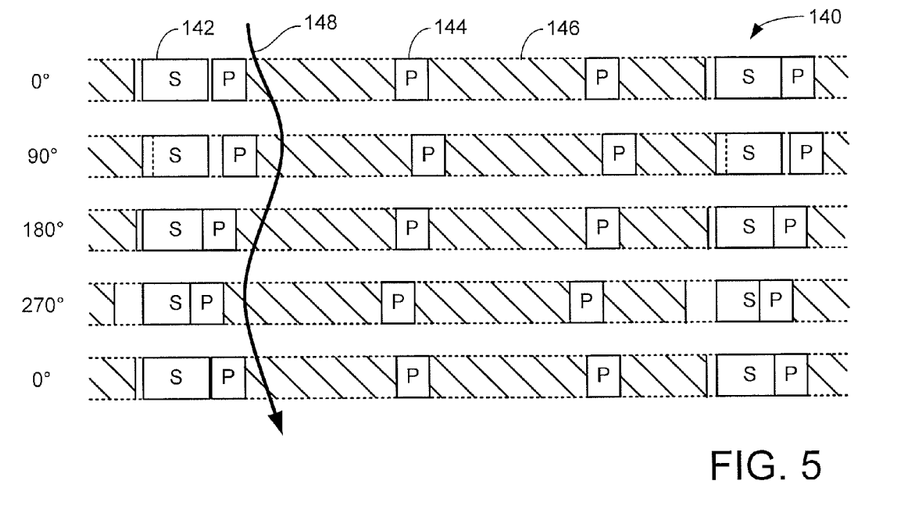
FIG. 5 illustrates misalignments and overlaps of respective servo fields and timing fields of a medium in some embodiments.

FIG. 5 is a schematic representation of an exemplary track 140 on a selected BPM to illustrate the effects of pattern misalignments and eccentricity errors. Servo (S) fields are denoted at 142. Timing fields (P) are denoted at 144. Data fields are represented by cross-hatched areas 146. For reference, the timing fields 144 are sometimes referred to as interspersed phase lock loop (iPPL) fields, or "P" fields as a shorthand convention. This explains the use of "P" rather than "T" for these fields. It will be appreciated, however, that other forms of timing fields can be used in accordance with the present discussion.

The track 140 is represented at four (4) angular positions relative to the data transducer 120 (FIG. 3); 0 degrees (index), 90 degrees, 180 degrees and 270 degrees. The index position (0 degrees) is shown twice. Each of the respective alignments will be encountered over each full revolution of the medium. Arrow 148 represents precession (relative positional change in the down track direction) of the timing (P) fields 144 relative to the servo (S) fields 142.

A nominally desired servo-timing alignment is present at 0 degrees. A large gap between the servo field 142 and the timing field 144 is present at 90 degrees. Substantial servo-timing overlap is present at 270 degrees. The arrangement at 180 degrees is similar to that of 90 degrees. It will be appreciated that these respective relationships are merely exemplary for purposes of illustration and the actual downtrack shifting (and cross-track shifting) of the respective fields can vary substantially from one medium to the next.

Figure 6:
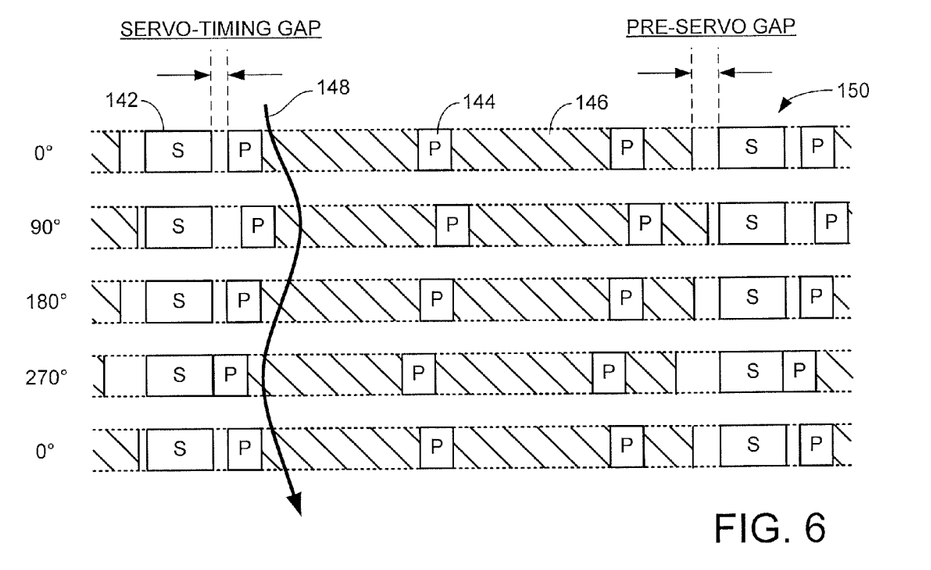
FIG. 6 illustrates introduction of a servo timing gap to compensate for the misalignments and overlaps of FIG. 5.

While gaps can be tolerated, overlaps tend to obscure the underlying features. Accordingly, as shown for another track 150 in FIG. 6, a selected servo-timing gap can be introduced to ensure no overlap occurs between the servo fields 142 and the timing fields 144. Similarly, a pre-servo gap can be provided for data fields 146 and the next occurring servo fields 142. The precession stays the same as indicated by arrow 148. Accordingly, some embodiments include the provision of suitable gaps as exemplified in FIG. 6 to reduce the incidence of overlaps of features from different templates. This can account for some of the error discussed above in medium 112 of FIG. 2B.

Figure 7:
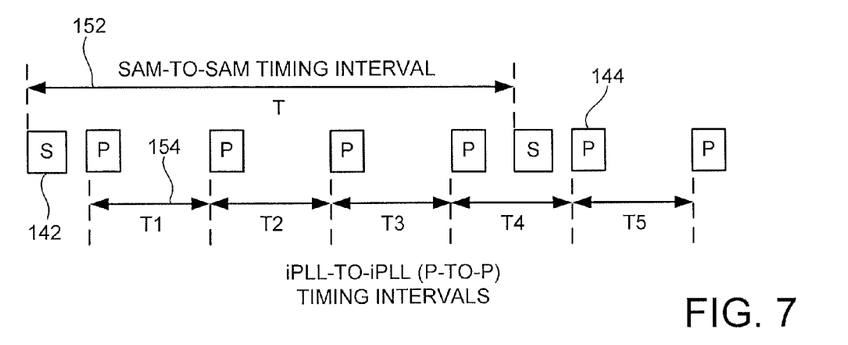
FIG. 7 shows a servo address mark (SAM) timing interval and an iPPL (interleaved phase lock loop) timing interval in some embodiments.

While operable to reduce obscured features, the use of gaps will not by itself address the other issues discussed above with regard to pattern misalignments and eccentricity errors. One reason is the continued variability in timing intervals between successively occurring servo and timing fields. FIG. 7 illustrates this by showing a pair of successive servo (S) fields 142 and a number of associated timing (P) fields 144 from FIGS. 5-6. Detection of each servo field 142 relies on detection of a servo address mark (SAM), which may be servo synchronization or other discernable pattern in each servo field. A servo (SAM-to-SAM) timing interval 152 having duration T will elapse between one servo field to the next. This time interval will not be constant, but instead will vary over each revolution of the track based on eccentricity error and other effects.

Similarly, timing (iPPL-to-iPPL or P-to-P) intervals 154 are shown in FIG. 7 with durations T1 to T5 between successive timing fields 144. These intervals will also not be constant, but will vary over each revolution of the track. Moreover, the time between the commencement of each servo interval 152 and the commencement of each time interval 154 will not be constant, but will depend on the respective gaps between the associated servo and timing fields.

Figure 8:
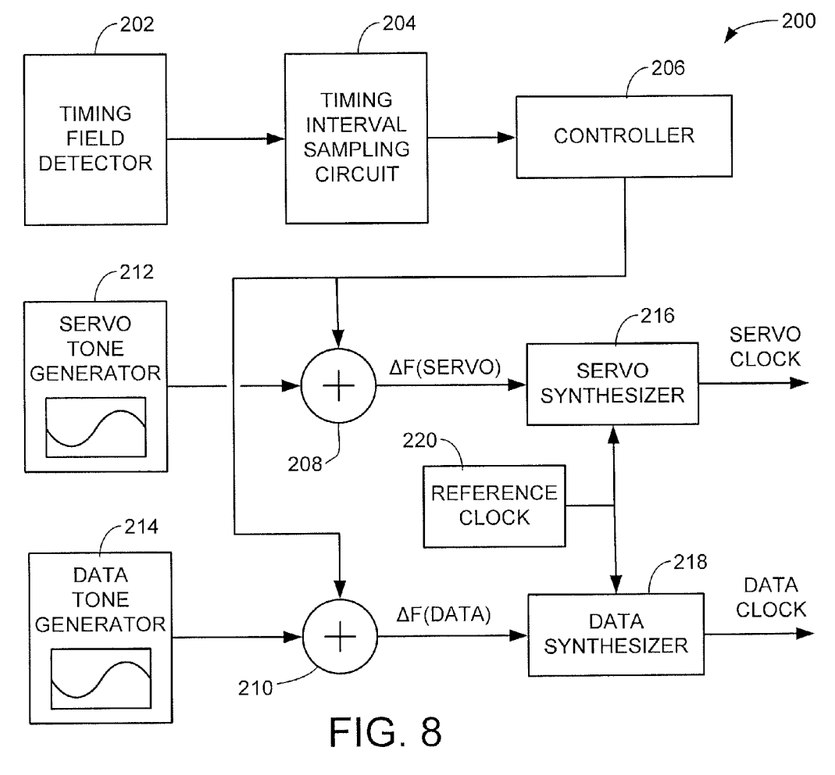
FIG. 8 is an exemplary disc-locked clock (DLC) circuit in accordance with some embodiments.

Accordingly, FIG. 8 is a functional block diagram for a disc-locked clock (DLC) control circuit 200 that can be used to generate suitable servo clock and data clock signals for servo control and read/write channel circuitry of a data storage device. As explained below, the servo and data clock signals accurately track the timing of the occurrence of each of the respective servo fields 142 and timing fields 144 and compensate for the differences in periodicity and precession of these features over each revolution of the medium.

As explained below, the circuit 200 uses P-to-P timing intervals and adjusts the respective servo and data clock signals based on changes (timing error) in these intervals (e.g., "P-to-P ΔT"). Reliance is made upon the timing intervals rather than the SAM-to-SAM intervals because of the higher sampling rate and precision provided by the timing fields. Separate tone generators are used to feed forward correction signals to provide RRO cancellation for the respective servo and timing field offsets (both from pattern misalignments and eccentricity errors). The circuit 200 can be realized in a number of ways, including in hardware, software/firmware or a combination thereof.

FIG. 8 shows a timing field detector 202 block adapted to detect the occurrence of each timing field 144. A timing interval sampling circuit 204 determines the P-to-P ΔT timing error. A controller block 206, such as a third order controller, outputs an input to each of a pair of summing junctions 208, 210.

A servo tone generator 212 is a predictive tone generator which is programmed or otherwise adaptively detects the amplitude and phase of the mechanical eccentricity of the respective servo fields 142 and outputs a first feedforward cancellation signal to cancel this once-around error associated with the placement of the servo fields 142. A data tone generator 214 operates in similar manner to detect the amplitude and phase of the mechanical eccentricity of the respective timing fields 144 and outputs a second feedforward cancellation signal to cancel the once-around error associated with the placement of the timing fields 144.

The summing junction 208 combines the servo feedforward cancellation signal with the timing correction from the controller 206 to generate a ΔF(servo) signal. This signal is a frequency modulation input to cause a servo synthesizer 216 to maintain a constant number of clock cycles between consecutive SAM detections. This effectively cancels out the apparent timing modulation of the mechanical eccentricity experienced by the servo fields. The synthesizer 216 thus outputs a servo clock with the same number of pulses between each successively occurring servo field 142.

In similar fashion, the summing junction 210 combines the data feedforward cancellation signal with the timing correction from the controller 206 to generate a ΔF(data) signal. This signal is a frequency modulation input to cause a data synthesizer 218 to maintain a constant number of clock cycles between consecutive iPPL timing field detections. This effectively cancels out the apparent timing modulation of the mechanical eccentricity of the timing fields 144. The synthesizer 216 thus outputs a data clock with the same number of pulses between each successively occurring timing field 144. Both the servo synthesizer 216 and the data synthesizer use a reference clock source 220 to provide one or more baseline frequencies that are thereafter adjusted in relation to the respective ΔF(servo) and ΔF(data) inputs.

It is contemplated that the tone frequency for both tone generators 212, 214 may be the same so some elements of the operation of these modules can be shared. The timing error component input from blocks 202, 204 and 206 will detect other sources of timing variation common to both servo and data, such as spin-speed variations, and thus can be used as an error source to modulate both the servo and data frequency clocks.

Figure 9:
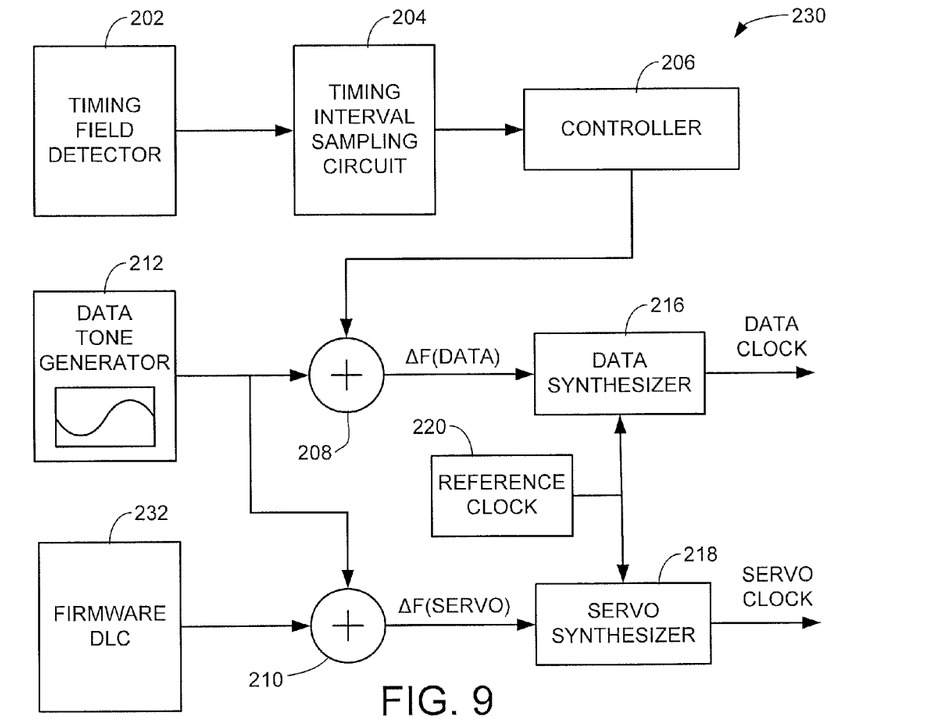
FIG. 9 is another exemplary DLC circuit in accordance with some embodiments.

FIG. 9 shows another DLC control circuit 230 in accordance with further embodiments. The DLC control circuit 230 is similar to the DLC control circuit 200 of FIG. 8, and so similar components are denoted using like reference numerals. Instead of using dual tone generators, the control circuit 230 uses a data tone generator 212 for the timing fields, but relies upon a firmware DLC module 232 to supply the requisite servo feedforward control input. Because of the lower sample rate of servo fields relative to the iPPL timing fields, this approach lends itself to implementation of existing servo based DLC correction routines in firmware. Register ports can be provided to allow the system firmware to generate and output the required correction values as needed.

Figure 10:
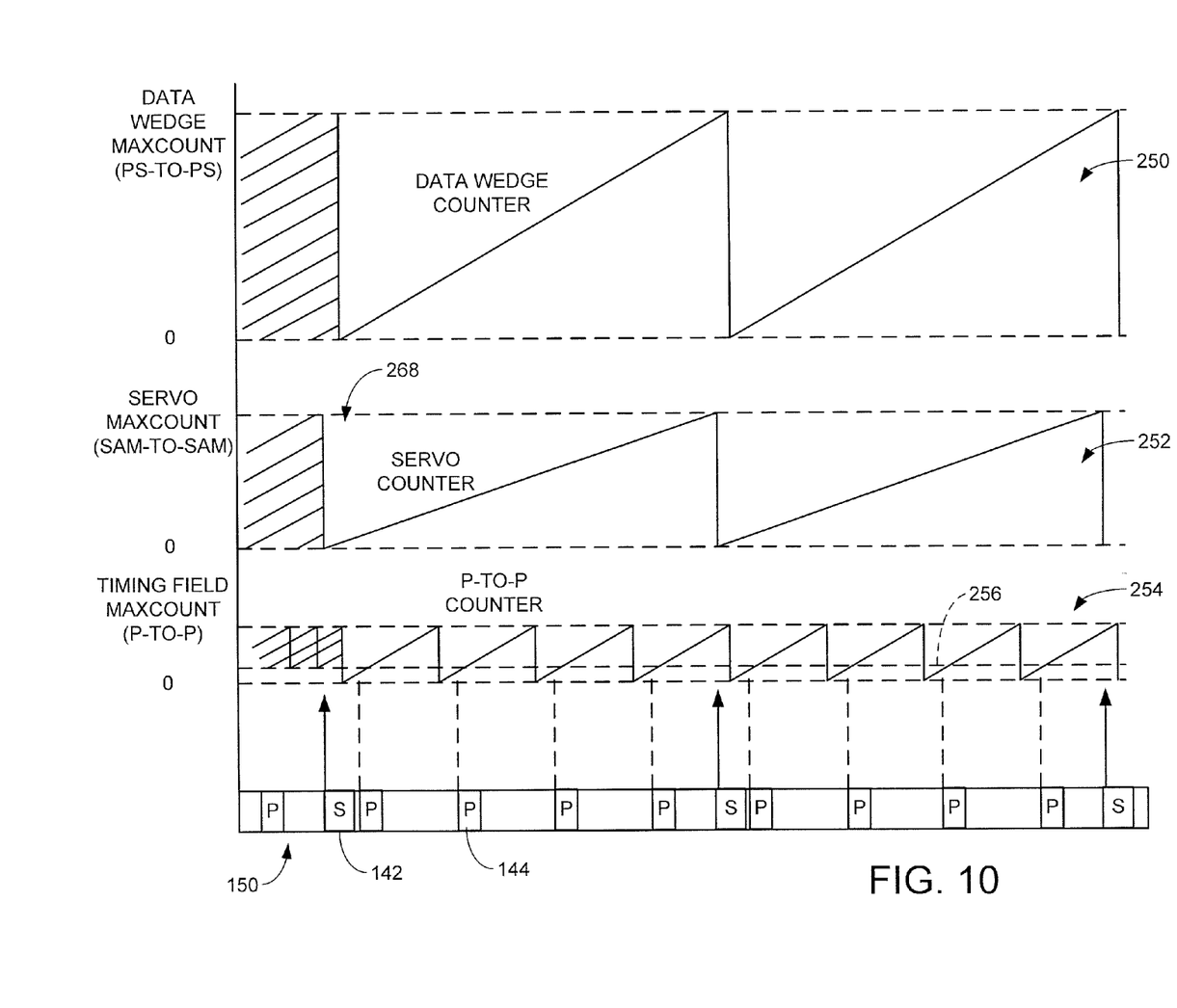
FIG. 10 is a timing diagram to illustrate operation of the respective DLC circuits of FIGS. 8 and 9 in accordance with some embodiments.

FIG. 10 is a timing diagram to generally illustrate operation of a data storage device that utilizes the respective control circuits 200, 230 of FIGS. 8-9. Three saw-tooth curves are represented in FIG. 10: a data wedge maxcount (e.g., a "PS-to-PS" counter) curve 250, a servo maxcount (e.g., a SAM-to-SAM counter) curve 252, and a timing field maxcount (e.g., a P-to-P counter) curve 254. The respective curves 250, 252 and 254 are aligned with a portion of the exemplary track 150 discussed above, with periodically arranged servo fields (S) 142 and timing fields (P) 144. See e.g., FIGS. 6-7.

Each of the curves 250, 252 and 254 represent the operation of respective counters that normally count from an initial value (such as zero) to a maxcount value, and then are reset. The term "PS" in the PS-to-PS curve 250 generally relates to the timing interval for the P fields from one servo field to the next (e.g., the length of each data wedge). In this way, the PS-to-PS curve 250 is generally locked to the P-to-P curve 254; that is, the P-to-P curve 254 resets upon the detected occurrence of each successive P field 144, while the PS-to-PS curve 250 continues to increase until the P field adjacent the next successive servo field is encountered.

One reason to use both P-to-P and PS-to-PS counters is that there may be some format events that happen once per P wedge, like the P fields themselves, and some events that happen once per data wedge, such as an "RRO-in-data" correction that can start at the beginning of each data wedge, and a "loopback" field that can be implemented at the end of each data wedge. In such cases, the P-to-P counter can be used to time the former events, and the PS-to-PS can be used for the latter events.

It will be appreciated that the once-per-data wedge events could be tracked using the P-to-P counter and a second counter to count the total number of P fields between servo wedges. It has been found, however, that using a separate PS-to-PS counter to track the once-per-wedge events simplifies the control effort. Accordingly, while the diagram of FIG. 10 shows three counters, of particular interest are the SAM-to-SAM and P-to-P counters, and the PS-to-PS counter is optional.

Generally, the respective counters that generate the curves 250, 252 and 254 can be configured to continuously run and be reset as different modes are entered. Reliance on the respective counters is thus switched in and out as required. For example, in some embodiments the SAM-to-SAM counter (curve 252) is used during seek and settle operations as the transducer (see e.g., FIG. 3) is moved to a new destination track. Once BPM mode (e.g., track following) is implemented on the destination track, timing control is switched to the P-to-P and PS-to-PS counters (curves 250, 254).

It can be seen that prior to entering BPM mode, the PS-to-PS counter value and the P-to-P counter values are generally meaningless and cannot be relied upon. Once servo qualification is completed, BPM mode is entered at the next SAM detection. The counters are reset and initiate counting, subsequently resetting at the occurrence of the next associated field; the SAM-to-SAM curve 252 resets (wraps) at each next servo field 142, while the curves 250 and 254 reset (wrap) at the appropriate timing fields 144.

These counter wrap periods will expand and contract in accordance with the associated clock frequency modulation as described above for the circuits of FIGS. 8 and/or 9. As required, a register programmed with a PGATE trigger value indicates the point on the P-to-P counter ramp where a timing field is located (line 256). The PGATE triggers the phase demodulation and correction of the timing signals.

It is contemplated that, if the data and servo clock frequencies are separately and appropriately modulated to track their particular eccentric variations using the respective circuits 200, 230 of FIGS. 8-9, then the SAM-to-SAM counter and P-to-P counter ramps (curves 252, 254), which are both clocked using the data clock frequency, will track the precession of the timing fields 144 relative to the servo fields. That is, the counter wrap periods will expand and contract in relation to the modulation of the data clock frequency.

Accordingly, one feature incorporated into the system is the capability of changing the starting value of the respective SAM-to-SAM and P-to-P counters (and as desired, the PS-to-PS counter) from a non-zero (non-baseline) initial count value at the SAM encountered when BPM mode is entered. This initial count corresponds to the phase of the once-around precession at the servo wedge where BPM mode is enabled to start the data-clocked event counter.

This initial count can be determined by measurements of the timing field precession relative to the servo fields, including through the use of strategically located tracks on the medium. Specially configured calibration tracks can be provisioned at certain locations, such as adjacent the ID and the OD of the medium, and precession in terms of servo field to timing field misalignment can be carried out. Values for different angular locations around the track can be stored in memory and recalled for use depending on the angular position of the medium when BPM mode is initiated. As desired, the specially configured calibration tracks can be provided with special sync marks or other indicators so that individual timing fields and servo fields can be identified.

Because the SAM-to-SAM and P-to-P counters free run after getting jump-started from servo synchronization, the precession relative to the servo fields becomes largely irrelevant after the data clocks and counters get locked to the timing of the iPPL timing fields 144. Accordingly, the channel only requires the initial count to execute a transition from servo sync to iPPL timing sync.

Figure 11:
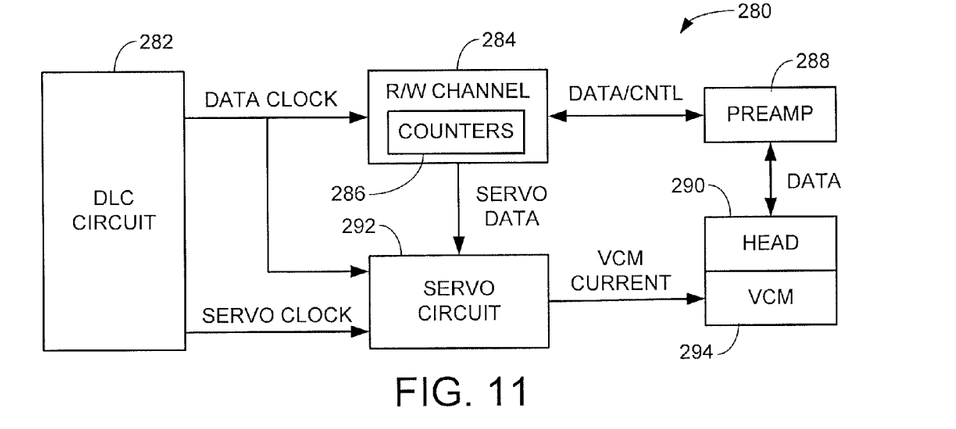
FIG. 11 is a functional block diagram of relevant aspects of a data storage device that utilizes a DLC circuit as in FIG. 8 or 9.

FIG. 11 is a functional block diagram of relevant aspects of a data storage device 280 in accordance with various embodiments. The device 280 includes a DLC circuit 282 configured to generate an adaptive data (timing) clock signal and servo clock signal as discussed above in FIGS. 8-9. The data clock signal is supplied to a read/write (R/W) channel 284, which includes counters 286 adapted to carry out the respective counts depicted in FIG. 10 during BPM mode.

The R/W channel 284 is configured to process write data for writing to the medium and read data obtained from the medium, and accordingly transfers data and control (cntl) signals to a preamplifier/driver (preamp) 288 which, in turn, provides write currents to a transducer (head) 290 during a data write operation and recovers and amplifies readback signals from the head during a read operation.

As required, the R/W channel 284 supplies demodulated servo data (such as from the servo fields 142) to a servo circuit 292. The servo circuit 292 also receives the servo clock from the DLC circuit 282 and operates, inter alia, to supply VCM control current to a VCM 294 coupled to the head 290 to controllably position the head in a radial position with respect to the medium. In this way, the counters 286 (used to generate the count curves in FIG. 10) can be initialized at a non-zero base value as BPM mode is initiated, as required.

Figure 12:
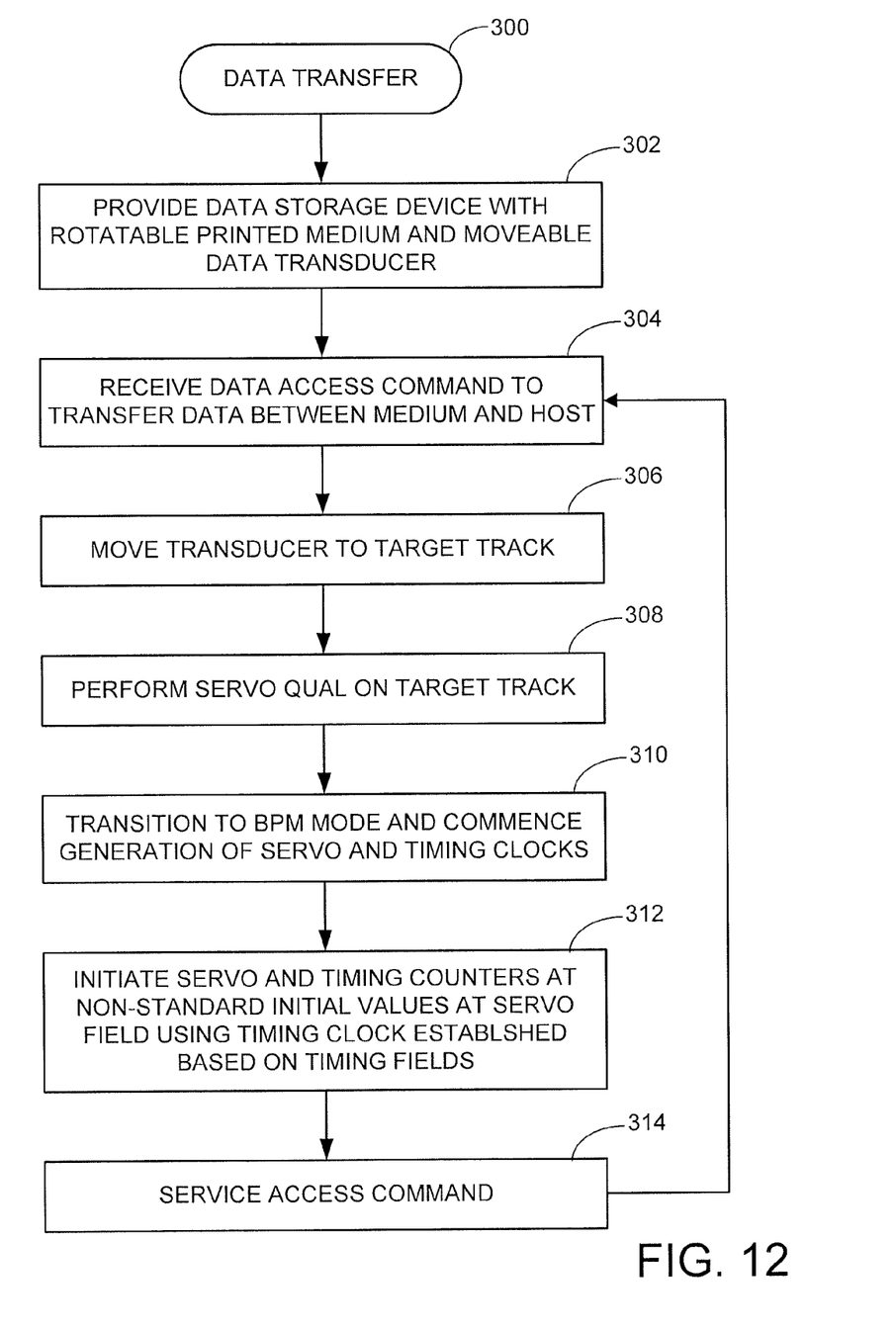
FIG. 12 is a flow chart illustrating steps carried out in accordance with some embodiments of the present disclosure.

FIG. 12 is a flow chart for a data transfer routine 300 carried out in accordance with various embodiments of the present disclosure. It will be appreciated that the steps in FIG. 12 provide a summary of the foregoing discussion in the context of a data transfer operation with a data storage device, but the various steps are merely illustrative and are not limiting.

At step 312, a data storage device is provided having one or more printed media and an associated data transducer, as discussed above in FIGS. 3 and 11. Each of the printed media may be a BPM and it is contemplated that multiple features are present on the medium including servo fields and timing fields.

A data access command is received by the data storage device at step 304. The data access command may be a read command to retrieve previously stored data from one or more of the media to a host device, a write command to write data to one or more of the media from the host device, or some other form of command requiring access of the respective media in the storage device.

At step 306, appropriate processing is supplied by the storage device to identify at least one target track on one or more of the media associated with the access command. The appropriate transducer (head) is accordingly advanced to be located adjacent the target track such as during a seek operation.

A servo qualification operation is next performed upon the target track at step 308. This may include the decoding of servo data from one or more servo fields, such as the servo fields 142 discussed herein. The servo qualification processing ensures that the transducer is located in a stable relationship over the destination (target) track, and therefore may include various positional qualifications, including establishing that a total amount of position error (e.g., position error signal, PES, magnitude) is less than a predetermined threshold for some number N (e.g., N=5) of successively encountered servo fields on the target track.

At such time that the servo qualification is successfully concluded, the device transitions to a BPM mode of operation at step 310. This commences the generation of separate servo and timing clocks as discussed above in FIGS. 8-9. The generation of the separate clocks takes into account the various pattern misalignment and eccentricity errors that tend to be present in various types of printed media as discussed above. The separate clocks are supplied to the respective circuits of the storage device as discussed in FIG. 11.

Counter circuitry associated with channel electronics (e.g., 284 in FIG. 11) use the respective servo and data clocks to initiate and operate counters that count and track successive occurrences of servo and timing fields on the medium along the target track, step 312. This includes the initialization of the respective counters to non-baseline values based on the angular orientation of the medium at the commencement of the BPM mode. This can include the operation of a control circuit of the channel 284 which, based on data from one or more calibration tracks, selects the non-baseline initialization value based on the angular position of the medium at the time that BPM (e.g., timing field mode) operation is commenced.

The access command is thereafter serviced at step 314 using the respective clocks and counter values of steps 310, 312. In the case of a write command, the timing control facilitates proper alignment of the transducer to write a magnetic pattern to a data area (e.g., data field 146) to store input write data to the medium. In the case of a read command, the timing control facilitates proper alignment of the transducer to read a previously stored magnetic pattern from a data area along the destination track. The recovered data are subsequently transferred to the requesting host, and additional commands are serviced in accordance with the foregoing steps.

It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a patterned data recording medium having a plurality of tracks, each track having data fields, servo fields and timing fields;
   a data transducer configured to sense the respective data, servo and timing fields on a target track; and
   a disc-locked clock (DLC) circuit that generates separate servo clock signals and data clock signals that are frequency modulated responsive to variations in locations of the timing fields.

2. The apparatus of claim 1, further comprising a timing field counter that initiates an incrementing count from a baseline value to a maximum value at each occurrence of a timing field along the target track during a timing field mode during which data are transferred between the transducer and the data fields, and a control circuit which initializes the timing field counter at a non-baseline intermediate value upon initialization of the timing field mode.

3. The apparatus of claim 1, wherein the patterned data recording medium is formed by application of a first template to a substrate comprising features corresponding to the data fields and the servo fields, and application of a second template to the substrate comprising features corresponding to the timing fields, wherein the servo clock and data clock signals adaptively compensate for precession and eccentricity errors associated with the respective locations of the data fields, servo fields and timing fields.

4. The apparatus of claim 1, wherein the DLC circuit generates an error value indicative of timing error as a difference in elapsed time between successively detected pairs of the timing fields, and uses the error value to generate a modulation frequency adjustment value to adjust respective frequencies of the respective servo clock and data clock signals.

5. The apparatus of claim 4, wherein the DLC circuit further comprises a data tone generator which generates a data feedforward compensation signal indicative of repeated runout (RRO) error associated with the timing fields, the data feedforward compensation signal combined with the error value to adjust a data synthesizer module to adjust the data clock so that a common total number of clock pulses are output between the occurrence of each pair of successively received timing fields.

6. The apparatus of claim 5, wherein the DLC circuit further comprises a servo tone generator which generates a servo feedforward compensation signal indicative of RRO error associated with the servo fields, the servo feedforward compensation signal combined with the error value to adjust a servo synthesizer module to adjust the servo clock so that a common total number of clock pulses are output between the occurrence of each pair of successively received servo fields.

7. The apparatus of claim 1, further comprising a read channel which uses the respective servo clock and data clock signals to control a transfer of data between a host device and the data fields of the patterned data recording medium.

8. The apparatus of claim 7, further comprising a servo control circuit which uses at least the servo clock signal to controllably position the transducer adjacent the target track.

9. The apparatus of claim 1, wherein the servo fields are arranged as a sequence of servo wedges that extend from an innermost diameter (ID) to an outermost diameter (OD) of the patterned data recording medium, the servo fields comprising servo positioning information adapted to facilitate controlled positioning of the data transducer adjacent concentric tracks defined on the patterned data recording medium.

10. The apparatus of claim 9, wherein the timing fields are characterized as interspersed phase lock loop (iPPL) fields each comprising a written pattern at a selected frequency to facilitate the transfer of data between a host device and the data fields.

11. The apparatus of claim 1, wherein the patterned data recording medium is characterized as a bit patterned medium (BPM) and the data fields comprise individually recordable dot islands of magnetic material surrounded by non-magnetic material.

12. A data storage system comprising:
a rotatable patterned data recording medium having a plurality of concentric tracks, each track having a plurality of data fields interspersed with a plurality of servo fields and a plurality of timing fields;
an actuator assembly supporting a data transducer configured to sense the respective data, servo and timing fields on a target track;
a disc-locked clock (DLC) circuit that generates separate servo clock and data clock signals that are frequency modulated responsive to variations in locations of the plurality of timing fields using a tone generator which generates a feedforward correction value to compensate for eccentricity error associated with locations of the timing fields; and
a data read/write channel configured to pass write currents to the transducer to write data to the data fields and to apply signal processing to readback signals from the transducer to read data from the data fields, the channel comprising a servo counter which uses the data clock to count from a baseline value to a maximum value over each interval between successively received servo fields and a data counter which uses the data clock to count from a baseline value to a maximum value over each interval between successively received timing fields.

13. The data storage system of claim 12, further comprising a servo control circuit adapted to controllably position the transducer adjacent the target track responsive to the servo clock and data clock signals.

14. The data storage system of claim 13, wherein the servo control circuit enters a servo qualification mode upon movement of the transducer to the target track responsive to readback signals detected from the servo fields and transitions to a timing field mode to initiate the generation of the servo clock and data clock signals.

15. The data storage system of claim 14, wherein the channel initiates the servo counter and the data counter at non-standard intermediate values at an occurrence of a next received servo field responsive to a previously characterized precession error between the servo fields and the timing fields at an associated angular position of the medium at which the timing field mode is initiated.

16. A method comprising:
rotating a patterned data recording medium at a selected rotational velocity about a central axis, the medium having a plurality of concentric tracks, each track having a plurality of data fields interspersed with a plurality of servo fields and a plurality of timing fields;
using a data transducer to sense the respective data, servo and timing fields on a target track on the medium; and
generating separate servo clock and data clock signals that are frequency modulated responsive to variations in locations of the plurality of timing fields as sensed by the transducer from the target track.

17. The method of claim 16, further comprising initiating a timing field counter using the data clock signal from a non-baseline value to a maximum value responsive to detection of a selected servo field, followed by resetting and initiating subsequent counts by the timing field counter from a baseline value to the maximum value at each successive occurrence of a timing field along the target track.

18. The method of claim 16, further comprising forming the patterned data recording medium by applying a first template to a substrate comprising features corresponding to the data fields and the servo fields, and by applying a second template to the substrate comprising features corresponding to the timing fields, wherein the servo clock and data clock signals adaptively compensate for precession and eccentricity errors associated with the respective locations of the data fields, servo fields and timing fields.

19. The method of claim 16, further comprising generating an error value indicative of timing error as a difference in elapsed time between successively detected pairs of the timing fields, and using the error value to generate a modulation frequency adjustment value to adjust respective frequencies of the respective servo clock and data clock signals.

20. The method of claim 16, wherein the servo fields are arranged as a sequence of servo wedges that extend from an innermost diameter (ID) to an outermost diameter (OD) of the printed medium, the servo fields comprising servo positioning information adapted to facilitate controlled position of the transducer adjacent concentric tracks defined on the medium, wherein the timing fields comprise interspersed phase lock loop (iPPL) fields having a magnetization pattern at a selected frequency, and the data fields comprise a sequence of dot islands of magnetic material surrounded by nonmagnetic material adapted to store magnetic domains corresponding to user data written to the medium.

\* \* \* \* \*